United States Patent
Kim et al.

(10) Patent No.: US 7,935,442 B2
(45) Date of Patent: May 3, 2011

(54) POLYMER BINDER FOR ELECTROCHEMICAL DEVICE COMPRISING MULTIPLY STACKED ELECTROCHEMICAL CELLS

(75) Inventors: Byoung Yun Kim, Daejeon (KR); Dong Jo Ryu, Daejeon (KR); Ju Hyun Kim, Daejeon (KR); Chang Sun Han, Daejeon (KR); Eun Young Goh, Goyang-si (KR); Hyang Mok Lee, Seoul (KR)

(73) Assignee: LG Chem, Ltd. (KR)

( * ) Notice: Subject to any disclaimer, the term of this patent is extended or adjusted under 35 U.S.C. 154(b) by 1107 days.

(21) Appl. No.: 11/435,538

(22) Filed: May 17, 2006

(65) Prior Publication Data

US 2006/0275661 A1    Dec. 7, 2006

(30) Foreign Application Priority Data

May 17, 2005    (KR) .................. 10-2005-0041194

(51) Int. Cl.
*H01M 4/62*    (2006.01)

(52) U.S. Cl. ............. 429/217; 429/231.95; 429/247; 429/322

(58) Field of Classification Search .......... 429/217, 429/231.95, 247, 322
See application file for complete search history.

(56) References Cited

U.S. PATENT DOCUMENTS

| | | | |
|---|---|---|---|
| 5,595,841 A * | 1/1997 | Suzuki | 429/217 |
| 6,371,997 B1 * | 4/2002 | Chang et al. | 29/623.5 |
| 6,656,633 B2 | 12/2003 | Yamakawa et al. | |
| 6,756,153 B1 | 6/2004 | Yamamoto et al. | |
| 6,881,517 B1 | 4/2005 | Kanzaki et al. | |

FOREIGN PATENT DOCUMENTS

| | | |
|---|---|---|
| JP | 2872354 | 1/1999 |
| JP | 3101775 | 8/2000 |
| KR | 20000075953 | 12/2000 |
| KR | 1020010082058 | 8/2001 |
| KR | 1020010082059 | 8/2001 |
| KR | 1020010055968 | 7/2004 |

OTHER PUBLICATIONS

International Search Report dated Aug. 22, 2006 for Application No. PCT/KR2006-001838.

* cited by examiner

*Primary Examiner* — Patrick Ryan
*Assistant Examiner* — Ben Lewis
(74) *Attorney, Agent, or Firm* — Cantor Colburn LLP (57) ABSTRACT

Disclosed is an electrochemical device, which comprises: (A) a binder comprising polymer particles obtained from the polymerization of: (a) 20-70 parts by weight of a (meth) acrylic acid ester monomer; (b) 20-60 parts by weight of a vinyl monomer; and (c) 0.01-30 parts by weight of an unsaturated carboxylic acid monomer, based on 100 parts by weight of a binder polymer; and (B) electrochemical cells stacked multiply by using the binder, wherein the binder allows electrode active material particles in an electrode to be fixed and interconnected among themselves and between the electrode active material and a collector, and the electrode and a separator that is in contact with the electrode are bonded to each other by way of hot fusion. The binder is also disclosed. The binder has excellent adhesion and thermal bonding characteristics, and thus is useful for an electrochemical device comprising multiply stacked electrochemical cells, and can improve the overall quality of a battery.

18 Claims, 4 Drawing Sheets

POLYMER BINDER FOR ELECTROCHEMICAL DEVICE COMPRISING MULTIPLY STACKED ELECTROCHEMICAL CELLS

This application claims the benefit of the filing date of Korean Patent Application No. 10-2005-0041194, filed on 17, May, 2005, in the Korean Intellectual Property Office, the disclosure of which is incorporated herein in its entirely by reference.

TECHNICAL FIELD

The present invention relates to a binder, which has excellent adhesion and thermal bonding characteristics and is useful for a high-capacity electrochemical device comprising multiply stacked electrochemical cells, an electrode comprising the same binder, and an electrochemical device, preferably a lithium secondary battery, having improved overall quality by using the same electrode.

BACKGROUND ART

Recently, there has existed increasing interest in energy storage technology. Batteries have been widely used as energy sources in portable phones, camcorders, notebook computers, PCs and electric cars, resulting in intensive research and development for them. In this regard, electrochemical devices are the subject of great interest. Particularly, development of rechargeable secondary batteries is the focus of attention. Recently, continuous studies have been performed to develop a novel electrode and battery having an improved level of capacity density and specific energy.

Among the currently used secondary batteries, lithium secondary batteries, developed in early 1990's, have a drive voltage and an energy density higher than those of conventional batteries using aqueous electrolytes (such as Ni—MH batteries, Ni—Cd batteries and $H_2SO_4$—Pb batteries), and thus are spotlighted in the field of secondary batteries. However, lithium secondary batteries have a problem related to their safety, due to ignition and explosion caused by the use of an organic electrolyte. Also, lithium secondary batteries have a disadvantage in that they are manufactured via a relatively complicated manufacturing process. A lithium ion polymer battery, developed recently, can improve the aforementioned problem and disadvantage of a lithium ion battery, and thus has been regarded as one of the most potent candidates for next-generation batteries. However, a lithium ion polymer battery shows a relatively lower capacity as compared to a lithium ion battery, and has an insufficient discharge capacity, particularly at low temperature. Meanwhile, since the capacity of a battery is in proportion to the content of an electrode active material, it is very important to design a cell structure in such a manner that as much an electrode active material as possible can be packed in a limited space provided by a battery pack.

To solve the aforementioned problems, Korean Laid-Open Patent Nos. 2001-0082058 and 2001-0082059 disclose an electrochemical device, which is manufactured with ease and has an efficient space structure sufficient to maximize the amount of an electrode active material, the electrochemical device comprising multiply stacked electrochemical cells. Herein, the basic unit of the stacked electrochemical cells is a full cell or a bicell.

Characteristics of a full cell or a bicell largely depend on the electrode, electrolyte and other materials used therein. Particularly, because the content of the active material introduced into an electrode is ultimately related to the maximum amount of lithium ions capable of binding, the capacity of a battery is in proportion to the content of an electrode active material. Hence, if a binder having excellent adhesion so as to reduce the amount of a binder, it is possible to provide an electrode comprising an active material in an amount increased accordingly. Therefore, there has been a need for a novel binder having excellent adhesion.

Meanwhile, commercially available binders for an electrode include polyvinylidene fluoride (PVDF)-based polymers. More particularly, PVDF-based polymers include PVDF homopolymer, and PVDF copolymers such as polyvinylidene fluoride-hexafluoropropylene copolymer (Korean Laid-Open Patent No. 2001-0055968) and polyvinylidene fluoride-chlorotrifluoroethylene copolymer. Such PVDF-based polymers are advantageous in that they are chemically and electrochemically stable. However, PVDF-based polymers are problematic in that they should be dissolved in an organic solvent such as NMP (N-methyl-2-pyrrolidone) and then used in the form of a binder composition, thereby causing an environmental problem; they show poor safety; and have low affinity to a liquid electrolyte, thereby causing degradation in the quality of an electrode. Additionally, although PVDF-based polymers perform their functions by surrounding an electrode active material and thus show a good binding property to inorganic particles, including electrode active material particles, they show low adhesion to a metal such as a collector. Hence, PVDF-based polymers have an additional disadvantage in that they are used in a great amount in order to exert and maintain sufficient adhesion to a metal, etc.

To solve the aforementioned problems, there has been an attempt to provide an aqueous binder, which uses water as a dispersion medium and is used in a smaller amount (JP 2872354, JP 3101775 and KR 2000-0075953). However, such aqueous binders show insufficient adhesion between a collector and an electrode active material, thereby providing poor quality. Moreover, when a thermal bonding process is performed between an electrode and a separator in order to provide a high-capacity electrochemical device comprising multiply stacked electrochemical cells, such aqueous binders cannot show sufficient adhesion, resulting in degradation in the overall quality of a battery. Therefore, there is a need for a novel binder, which shows sufficient adhesion between an electrode active material and a collector, and permits thermal bonding between an electrode and a separator so as to provide multiply stacked electrochemical cells.

BRIEF DESCRIPTION OF THE INDICATIONS IN THE DRAWINGS

7: Cathode
8: anode
10, 17, 17', 17": full cell
11: anode current collector
12: cathode current collector
13: anode active material
14: cathode active material
15, 19: separator
16, 18, 20: stacked cell including full cells
21, 23, 24, 24'; bicell
22, 25, 26: stacked cell including bicells

DISCLOSURE OF THE INVENTION

Therefore, the present invention has been made in view of the above-mentioned problems. The inventors of the present invention have prepared binders by polymerizing copolymerizable monomers, forming a binder, with various compositional ratios. The inventors have found a binder composition, which uses water as a dispersion medium, and thus is environmentally-friendly, imparts sufficient adhesion between a collector and an active material even when used in a small amount to provide a battery with high-capacity, and maintains adhesion after thermal bonding to provide excellent thermal bonding characteristics between an electrode and a separator, so as to be used in a high-capacity electrochemical device comprising multiply stacked electrochemical cells. The present invention is based on this finding.

Therefore, it is an object of the present invention to provide a binder, which shows high adhesion to a collector and excellent thermal bonding characteristics to a separator, and thus can improve rate characteristics and lifespan characteristics of a battery at the same time. It is another object of the present invention to provide an electrode using the same binder, and an electrochemical device, preferably a lithium secondary battery, comprising the same electrode.

The present invention provides a binder comprising polymer particles obtained from the polymerization of:

(a) 20~79 parts by weight of a (meth)acrylic acid ester monomer; (b) 20~60 parts by weight of a vinyl monomer; and (c) 0.01~30 parts by weight of an unsaturated carboxylic acid monomer, based on 100 parts by weight of a binder polymer. The present invention also provides an electrode chemical device comprising a plurality of electrochemical cells stacked by using the above binder, wherein the binder allows electrode active material particles in an electrode to be fixed and interconnected among themselves and between the electrode active material and a collector, and the electrode and a separator that is in contact with the electrode are bonded to each other by way of hot fusion. The present invention further provides a binder that may be used in the above electrochemical device.

Hereinafter, the present invention will be explained in more detail.

The present invention is characterized by providing an environmentally-friendly binder, suitable for the production of a novel electrochemical device, which is manufactured via a simple process compared to a conventional process for manufacturing cells, and utilizes its inner space more efficiently so as to obtain high capacity.

Figure 1:
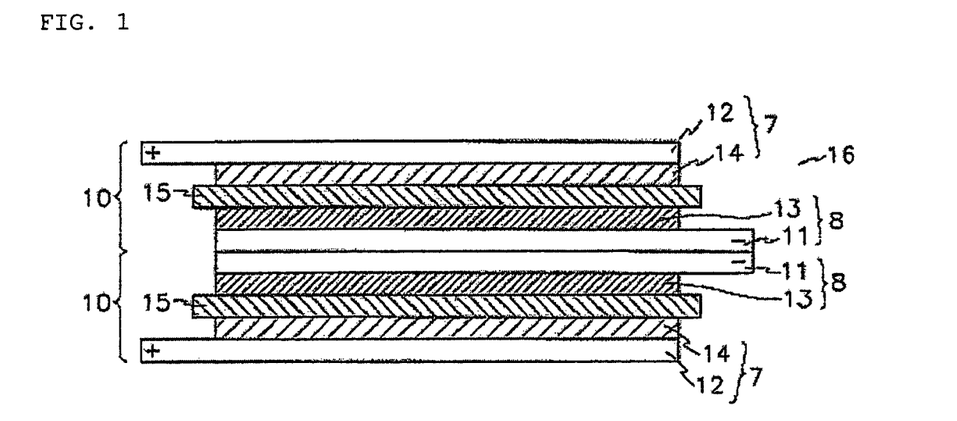
FIG. 1 is a schematic view showing the layered structure of stacked cells having two full cells, each full cell comprising a single side-coated cathode, a separator and a single side-coated anode.
Figure 2:
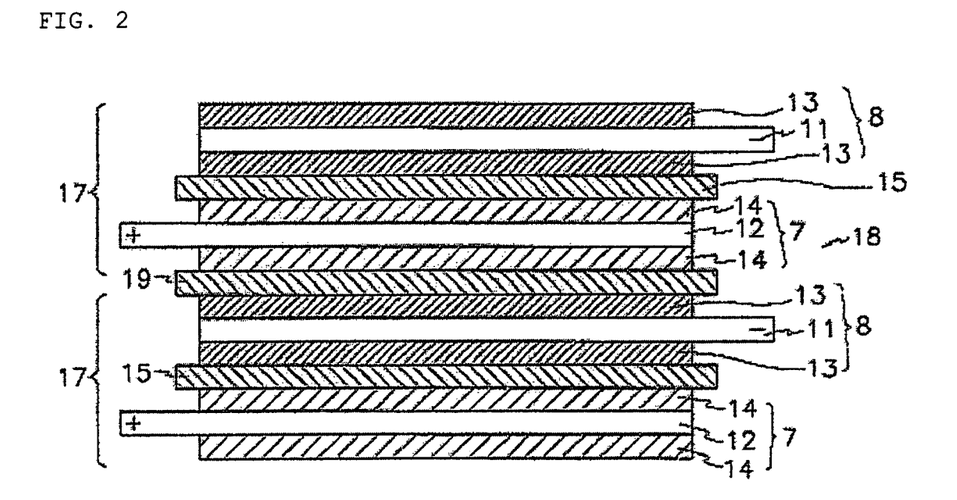
FIG. 2 is a schematic view showing the layered structure of stacked cells using a full cell comprising a double side-coated cathode, a separator and a double side-coated anode, as a unit cell.
Figure 3:
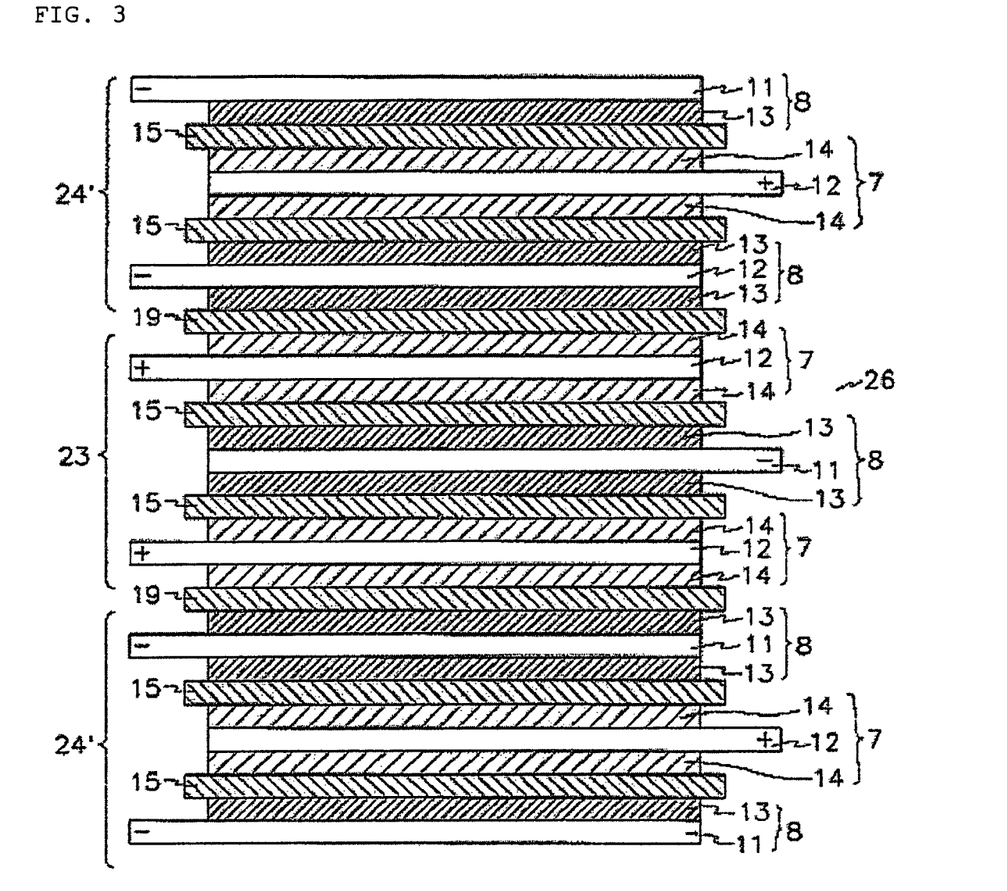
FIG. 3 is a schematic view showing the layered structure of stacked cells including bicells (a first outer bicell and a second outer bicell), each comprising partially single side-coated electrodes and a separator, and a bicell (inner bicell) comprising double side-coated electrodes and a separator.

According to the process for manufacturing a novel electrochemical device, it is possible to solve the problems occurring in the prior art, such problems being that the number of electrodes increases undesirably due to the overlapped electrodes, when two or more unit cells, each comprising a single side-coated cathode, a separator and an anode, are stacked, and the efficiency of a battery decreases as determined in terms of the space and weight of the battery (see FIG. 1). In the process, a plurality of full cells or bicells are stacked by using each full cell or bicell as a basic unit cell, a separator is inserted into each overlapped portion in the full cells or bicells, and then the separator is bonded thereto by way of hot fusion (see FIGS. 2 and 3).

When manufacturing such multiply stacked electrochemical cells, it is necessary to continuously maintain the adhesion between an electrode and a separator formed by way of hot fusion. In the case of a conventional electrode comprising a currently used PVDF-based binder, there is an advantage in that adhesion between an electrode and a separator can be maintained continuously after carrying out hot fusion. However, such PVDF-based binders cause an environmental problem because they are used in the form of a binder composition after dissolving them into an organic solvent. Additionally, such PVDF-based binders show lower adhesion between an electrode active material and a collector compared to the adhesion among the active material particles in the electrode, thereby providing insufficient structural safety to an electrode, resulting in degradation in the stability and lifespan characteristics of an electrochemical device. Further, such PVDF-based binders have low affinity to a liquid electrolyte, thereby causing degradation in the quality of an electrode.

On the contrary, the inventors of the present invention have found a binder composition having optimized physical properties, including hydrophilicity, adhesion, thermal bonding characteristics, physical stability during and/or after the manufacture of an electrochemical device and quality of a battery by polymerizing monomers related to the above physical properties with various compositional ratios. Therefore, the present invention provides a binder suitable for the aforementioned electrochemical device comprising multiply stacked cells. In other words, the binder is dispersed with ease in an organic solvent currently used in the art and/or an aqueous solvent, and thus is environmentally-friendly. In addition to this, the binder can provide an adhesion value sufficient to allow electrode active material particles to be fixed among themselves and to be interconnected with a collector.

Additionally, the binder contains a maximized amount of monomer capable of controlling adhesion property while ensuring its physical stability. Hence, the binder can maintain the adhesion between an electrode and a separator continuously even during and after carrying out hot fusion. Accordingly, it is possible to improve the structural stability of an electrode and multiply stacked electrochemical cells comprising the electrode, thereby improving the lifespan characteristics of the device. At the same time, it is possible to improve the rate characteristics of a battery through the activation of electrode reactions, caused by the efficient space structure of the electrochemical device in which a plurality of unit cells are stacked so as to realize high capacity.

In fact, it can be seen from the examples and experimental examples of the present invention that the binder according to the present invention shows excellent adhesion among electrode active material particles as well as between an electrode active material and a collector; maintains adhesion between the electrode and a separator adjacent thereto even when performing hot fusion between both of them; and thus is useful as a binder suitable for an electrochemical device comprising multiply stacked electrochemical cells and can improve the overall quality of the electrochemical device, for example, rate characteristics as well as lifespan characteristics of the electrochemical device (see the following Table 4).

1. Binder for Electrochemical Device

The first monomer (a), forming the binder polymer according to the present invention, is a conventional monomer that is known to one skilled in the art as a monomer capable of controlling the quality of a battery. Particularly, a (meth) acrylic acid ester monomer, which improves rate characteristics of a battery by increasing the affinity to an electrolyte and shows excellent adhesion to a collector, may be used as the first monomer.

Non-limiting examples of such (meth)acrylic acid ester monomers include: (1) acrylate monomers (e.g., methyl acrylate, ethyl acrylate, propyl acrylate, isopropyl acrylate, n-butyl acrylate, isobutyl acrylate, n-amyl acrylate, isoamyl acrylate, n-hexyl acrylate, 2-ethylhexyl acrylate, hydroxyethyl acrylate, hydroxypropyl acrylate, lauryl acrylate); (2) methacrylate monomers (e.g., methyl methacrylate, ethyl methacrylate, propyl methacrylate, isopropyl methacrylate, n-butyl methacrylate, isobutyl methacrylate, n-amyl methacrylate, isoamyl methacrylate, n-hexyl methacrylate, 2-ethylhexyl methacrylate, hydroxyethyl methacrylate, hydroxypropyl methacrylate, lauryl methacrylate, allyl methacrylate); or mixtures thereof.

Although there is no particular limitation in the content of the (meth)acrylic acid ester monomer, the (meth)acrylic acid ester monomer is used preferably in an amount of 20~79 parts by weight per 100 parts by weight of the binder polymer according to the present invention. If the (meth)acrylic acid ester monomer is used in an amount of less than 20 parts by weight, adhesion characteristics of the binder may be degraded significantly. If the (meth)acrylic acid ester monomer is used in an amount of greater than 79 parts by weight, it may not be possible to prepare the binder itself because of low stability of the binder during the preparation thereof.

The second monomer (b) forming the binder polymer according to the present invention, is a conventional monomer that is known to one skilled in the art as a monomer capable of controlling the quality of a battery. Particularly, a vinyl monomer, which is capable of controlling adhesion among electrode active material particles and has excellent ion conductivity, may be used. Non-limiting examples of the second monomer include styrene, α-methylstyrene, β-methylstyrene, p-t-butylstyrene, acrylonitrile, methacrylonitrile or a mixture thereof. More particularly, acrylonitrile monomer, which contains a triple bond, can provide high ion conductivity and improve electrical properties.

Although there is no particular limitation in the content of the vinyl monomer, the vinyl monomer is used preferably in an amount of 20~60 parts by weight per 100 parts by weight of the binder polymer, but is not limited thereto. If the vinyl monomer is used in an amount of less than 20 parts by weight, it may not be possible to prepare the binder itself because of low stability of the binder during the preparation thereof. If the vinyl monomer is used in an amount of greater than 60 parts by weight, the binder shows a significantly decreased adhesion value because such a large amount of vinyl monomer increases the glass transition temperature.

The third monomer (c) forming the binder polymer according to the present invention is a monomer capable of controlling adhesion. Such monomers are preferred because they can realize a high-capacity battery even when the resultant binder polymer is introduced in a small amount. Particularly, the monomer capable of controlling adhesion can improve the adhesion due to excellent binding force of the functional groups contained in the monomer to a metal.

Non-limiting examples of the monomer (c) capable of controlling adhesion include: (1) unsaturated monocarboxylic acid monomers (e.g., acrylic acid, methacrylic acid, etc.); (2) unsaturated dicarboxylic acid monomers (e.g., itaconic acid, fumaric acid, citraconic acid, methaconic acid, glutaconic acid, crotonic acid, isocrotonic acid, etc.); (3) acrylamide monomers (e.g., acrylamide, n-methylolamide, n-butoxymethylacrylamide, etc); (4) methacrylamide monomers (e.g., methacrylamide, n-methylol methacrylamide, n-butoxymethylmethacrylamide, etc.) or a mixture thereof. Among these monomers, unsaturated carboxylic acid monomers are preferred. Although there is no particular limitation in the content of the monomer capable of controlling adhesion, the monomer is used preferably in an amount of 0.01~30 parts by weight per 100 parts by weight of the binder polymer according to the present invention. If the monomer (c) is used in an amount of less than 0.01 parts by weight, adhesion of the binder polymer decreases. If the monomer (c) is used in an amount of greater than 30 parts by weight, it may not be possible to prepare the binder itself because of low stability of the binder during the preparation thereof.

The binder may further comprise a monomer currently used in the art. Additionally, the binder according to the present invention preferably comprises 3~10 kinds of the above-described monomers, but is not limited thereto.

Preferably, the polymer particles, comprising the above monomers in the aforementioned ratio, have a final particle diameter of 100~400 nm, a polymer glass transition temperature of −30~50° C., and a gel content of 30~99%. More preferably, the polymer particles have a final particle diameter of 100~400 nm, a glass transition temperature of −30~50° C., and a gel content of 50~99%. In fact, it was found that the binder according to the present invention that satisfies the aforementioned conditions shows excellent properties, including adhesion in an electrode and adhesion between an electrode and a collector, and thermal bonding characteristics between an electrode and a separator, and provides a battery with excellent characteristics such as rate characteristics and lifespan characteristics, as compared to a binder according to the prior art.

When the polymer particles are away from the aforementioned ranges of particle diameter, glass transition temperature and gel content, adhesion between the resultant binder and a collector may be degraded significantly, resulting in deterioration of the quality of a battery. For example, when the binder polymer has a final particle diameter of less than 100 nm, the binder shows high movability among electrode active material particles, resulting in a drop in the adhesion value. When the binder polymer has a final particle diameter of greater than 400 nm, the binder particles have a reduced surface area, resulting in a drop in the adhesion value. When the binder has a glass transition temperature of lower than −30° C., it is difficult to prepare the binder itself due to the low stability during the preparation. When the binder polymer has a glass transition temperature of higher than 50° C., the binder shows an undesirably low adhesion value. Further, when the binder polymer has a gel content of less than 50%, the binder shows low stability during the preparation thereof.

Meanwhile, the aforementioned monomers except the unsaturated carboxylic acid monomer (c) (i.e., the acrylate (methacrylate) monomer (a) and the vinyl monomer (b)) can control the overall quality of a battery, including initial capacity, initial efficiency, capacity variation during repeated charge/discharge cycles or other physical properties of a battery.

Each of the monomers capable of controlling the quality of a battery has a specific surface energy. Thus, the polymer formed by using the monomers has a different surface energy depending on the composition of the monomers. The surface energy difference causes a difference in the affinity to an electrolyte. Thus, the binder according to the present invention can be dispersed in water as well as NMP conventionally used as a dispersion medium and conventional organic solvents used in a non-aqueous electrolyte. Therefore, it is possible to solve the problem of PVDF, related to the use of an organic solvent, and the binder according to the present invention is environmentally-friendly. Additionally, when the binder is used to manufacture an electrode, it is possible to activate electrochemical reactions, caused by the conduction and transfer of lithium ions in the electrode, by increasing the affinity to an electrolyte, and by improving the permeability of the electrolyte into the electrode, while utilizing the pore volume of the electrode sufficiently, and thus it is possible to improve the overall quality, including rate characteristics, of a battery.

Further, according to the present invention, it is also possible to maximize the adhesion value between an electrode and a collector and the thermal bonding effect between an electrode and a collector via hot fusion by using the monomer capable of controlling the adhesion (such as an unsaturated carboxylic acid monomer), to the maximum extent. Herein, it is thought that the above effects can be obtained from the chemical bond, such as the ionic bond, formed between the carboxyl (—COOH) group present in the unsaturated carboxylic acid monomer and copper ions contained in a copper collector.

The binder according to the present invention may further comprise conventional additives, such as a molecular weight modifier and a crosslinking agent, in addition to the aforementioned monomers. It is possible to control the gel content of the binder particles by controlling the amount of the molecular weight modifier and that of the crosslinking agent.

The molecular weight modifier that may be used in the present invention includes t-dodecyl mercaptan, n-dodecyl mercaptan, n-octyl mercaptan, or the like. The crosslinking agent that may be used in the present invention includes 1,3-butanediol diacrylate, 1,3-butanediol dimethacrylate, 1,4-butanediol diacrylate, 1,4-butanediol dimethacrylate, aryl acrylate, aryl methacrylate, trimethylolpropane triacrylate, tetraethyleneglycol diacrylate, tetraethyleneglycol dimethacrylate, divinylbenzene, or the like.

As a polymerization initiator, any compound that causes generation of radicals may be used, and particular examples thereof include ammonium persulfate, potassium persulfate, sodium persulfate, benzoyl peroxide, butyl hydroperoxide, cumene hydroperoxide, azobisisobutyronitrile, or a mixture thereof. Among these, a water soluble or redox polymerization initiator is preferred.

The polymer particles according to the present invention may be prepared by a conventional polymerization process known to one skilled in the art, for example, by an emulsion polymerization process, a suspension polymerization process, a dispersion polymerization process, a two-step polymerization process using seed polymerization, or the like. Herein, polymerization temperature and polymerization time may be selected depending on the kind of the polymerization initiator used for the polymerization. For example, polymerization may be carried out at a temperature of about 30~100° C. for 0.5~20 hours.

2. Binder Composition for Electrode of Battery

The binder for an electrochemical device according to the present invention may be dissolved into a solvent or may be dispersed into a dispersion medium in a conventional manner to provide a binder composition. However, the binder according to the present invention may be dispersed in water as well as an organic solvent or dispersion medium, and thus is environmentally-friendly.

There is no particular limitation in the solvent or the dispersion medium used for the binder composition according to the present invention. However, it is preferable to use a solvent or a dispersion medium present in a liquid state at room temperature under ambient pressure, because such solvents or dispersion media allow the polymer particles to maintain the shape, when electrode slurry comprising the binder composition is applied onto a collector and then dried.

Preferably, the dispersion medium that may be used in the present invention is one capable of dispersing the polymer particles and an electrode active material. Particular examples of the dispersion medium include water; alcohols such as methanol, ethanol, propanol, isopropanol, butanol, isobutanol, s-butanol, t-butanol, pentanol, isopentanol, hexanol, or the like; ketones such as acetone, methyl ethyl ketone, methyl propyl ketone, ethyl propyl ketone, cyclopentanone, cyclohexanone, cycloheptanone, or the like; ethers such as methyl ethyl ether, diethyl ether, dipropyl ether, diisopropyl ether, dibutyl ether, diisobutyl ether, di n-amyl ether, diisoamyl ether, methyl propyl ether, methyl isopropyl ether, methyl butyl ether, ethyl propyl ether, ethyl isobutyl ether, ethyl n-amyl ether, ethyl isoamyl ether, tetrahydrofuran, or the like; lactones such as γ-butyrolactone, δ-butyrolactone, or the like; lactames such as β-lactame, or the like; cycloaliphatic compounds such as cyclopentane, cyclohexane, cycloheptane, or the like; aromatic hydrocarbons such as benzene, toluene, o-xylene, m-xylene, p-xylene, ethyl benzene, propyl benzene, isopropyl benzene, butyl benzene, isobutyl benzene, n-amyl benzene, or the like; aliphatic hydrocarbons such as heptane, octane, nonane, decane, or the like; linear or cyclic amides such as dimethyl formamide, N-methylpyrrolidone, or the like; esters such as methyl lactate, ethyl lactate, propyl lactate, butyl lactate, methyl benzoate, or the like; and other liquid substances that serve as the solvent of the electrolyte as described hereinafter. Among these, it is preferable to use a dispersion medium having a boiling point of 80° C. or higher, preferably of 85° C. or higher in view of a practical process for manufacturing an electrode. Additionally, it is possible to use 2~5 kinds of the aforementioned dispersion media in combination.

Further, other additives, preservatives or stabilizers, as described hereinafter, may be added to the binder composition, if desired.

3. Slurry for Electrode

The present invention provides slurry for an electrode, which comprises: (a) the binder as defined above; and (b) an electrode active material. If desired, the slurry may further comprise other additives generally known to one skilled in the art.

The electrode active material is the most important material that determines the capacity of a battery. Any cathode active material generally used in a lithium secondary battery can be used in the present invention, and non-limiting examples of such cathode active materials include metal oxides such as lithiated cobalt oxides, lithiated nickel oxides, lithiated manganese oxides, etc., or composite oxides formed by combination thereof, conductive polymers such as polypyrole, polyaniline, polyacetylene, polythiophene, etc., or composite oxides formed by combination of a metal oxide with a conductive polymer. Also, any anode active material generally used in a lithium secondary battery can be used in the present invention, and non-limiting examples of such anode active materials include carbonaceous materials such as natural graphite, artificial graphite, MPCF, MCMB, PIC, plasticized phenol resins, PAN-based carbon fibers, petroleum coke, activated carbon, graphite, etc., conductive polymers such as polyacene, lithium-based metals such as lithium metal or lithium alloy, or the like.

If desired, the electrode slurry may further comprise a conductive agent, a viscosity modifier, a supplementary binder, or the like, in addition to the aforementioned active material.

Particular examples of the viscosity modifier that may be used in the present invention include water soluble polymers such as carboxymethyl cellulose, carboxyethyl cellulose, ethyl cellulose, hydroxymethyl cellulose, hydroxypropyl cellulose, carboxyethylmethyl cellulose, polyethylene oxide, ethylene glycol, or the like, but are not limited thereto.

4. Electrode for Electrochemical Device

The present invention also provides an electrode for an electrochemical device, preferably for a lithium secondary battery, which comprises the slurry comprising the binder according to the present invention and an electrode active material.

The electrode may be manufactured by a method generally known to one skilled in the art. In one embodiment of the method, electrode slurry comprising a mixture of the binder composition with an active material is applied onto a current collector, and the dispersion medium is removed by drying or by other means, so that the active material particles are bonded to the current collector and are bonded among themselves.

Any collector may be used with no particular limitation, as long as it is formed of a conductive material. Non-limiting examples of the cathode current collector include foil formed of aluminum, nickel or a combination thereof. Non-limiting examples of the anode current collector include foil formed of copper, gold, nickel, copper alloys or a combination thereof.

5. Electrochemical Device

In addition to the binder, the present invention also provides an electrochemical device comprising the multiply stacked electrochemical cells using the binder.

The electrochemical device according to the present invention is an electrochemical device having such a structure that the content of an electrode active material can be maximized by utilizing the space of the electrochemical device with a significantly higher efficiency compared to a conventional electrochemical device. Particularly, in the electrochemical device, a plurality of full cells or bicells are stacked as basic unit cells, and a separator is inserted into each overlapped portion in the full cells or bicells by way of thermal bonding using hot fusion technique (see FIGS. 2 and 3).

Herein, the full cell means an electrochemical cell comprising a cathode, a separator or an anode, in order or inverse order. The bicell means an electrochemical cell including an electrode having one polarity at the center thereof and electrodes having the opposite polarity at both sides thereof. For example, the bicell comprises: a cathode, a separator, an anode, a separator, and a cathode; or an anode, a separator, a cathode, a separator, and an anode. Additionally, each full cell or bicell present at the outermost part of the electrochemical device includes an electrode comprising an electrode active material coated on the surface of a collector, such as a cathode comprising a cathode collector whose surface is coated with a cathode active material, or an anode comprising an anode collector whose surface is coated with an anode active material. Also, at the outermost layer, collector foil may be used instead of the single-side coated active material layer (see FIGS. 2 and 3).

Additionally, according to the present invention, both surfaces of a current collector may be coated with the same electrode active material. Thus, the active material present on the outer surface, which is not utilized in a unit cell, can form another full cell along with an active material coated on the counter electrode of another unit cell, adjacent to the unit cell. Therefore, as shown in FIG. 1, it is possible to solve the problems occurring when a single surface of a current collector is coated with an electrode active material, such problems being that the number of electrodes increases and the efficiency of a battery decreases as determined in terms of the space and weight of a battery. It is also possible to improve the overall quality of a battery by activating reactions in the battery by virtue of the efficient space structure of the electrochemical device.

The electrochemical device according to the present invention includes any device in which electrochemical reactions are performed. Particular examples thereof include all types of primary batteries, secondary batteries, fuel cells, solar cells, super capacitors, ultra capacitors and pseudo capacitors, and various sensors, electrolyzing devices and electrochemical reactors. Particularly, the electrochemical device according to the present invention is a secondary battery, including a lithium metal secondary battery, a lithium ion secondary battery, a lithium polymer secondary battery, or a lithium ion polymer secondary battery. Preferably, the electrochemical device is a lithium ion polymer battery.

The electrochemical device according to the present invention may be manufactured by a conventional method known to one skilled in the art. A preferred embodiment of the method comprises the steps of: (a) providing a first outermost full cell, a second outermost full cell and an inner full cell interposed between both full cells; (b) stacking the first outermost full cell, the inner full cell and the second outermost full cell, in turn, in such a manner that the collector of each single-side coated electrode is located at the outermost layer, inserting a separator into each overlapped portion of the full cells, and bonding the separator to the full cells via hot fusion to provide a stacked structure; and (c) introducing the stacked full cells into a battery casing, injecting an electrolyte thereto, and sealing the battery casing.

At this time, it is possible to perform the above method by using a bicell as a basic unit cell instead of a full cell. Additionally, bonding of the separator via hot fusion may be performed in a conventional manner, for example, by passing the stacked full cells including the separator through a roll laminator at 60~100° C.

Also, the full cell or the bicell may be prepared by a conventional method known to one skilled in the art. A preferred embodiment of the method comprises the steps of: (i) coating a cathode current collector with a cathode active material to provide a cathode; (ii) coating an anode current collector with an anode active material to provide an anode; and (iii) interposing a separator between the cathode and the anode and bonding the separator to the electrodes via hot fusion to provide a full cell. Herein, a bicell, for example, cathode-separator-anode-separator-cathode, or anode-separator-cathode-separator-anode, may be manufactured by stacking a separator on one electrode of both electrodes of the full cell obtained from step (iii) and further stacking the counter electrode thereon.

The electrolyte that may be used in the present invention includes a salt represented by the formula of $A^+B^-$, wherein $A^+$ represents an alkali metal cation selected from the group consisting of $Li^+$, $Na^+$, $K^+$ and combinations thereof, and $B^-$ represents an anion selected from the group consisting of $PF_6^-$, $BF_4^-$, $Cl^-$, $Br^-$, $I^-$, $ClO_4^-$, $AsF_6^-$, $CH_3CO_3^-$, $N(CF_3SO_2)_2^-$, $C(CF_2SO_2)_3^-$ and combinations thereof, the salt being dissolved or dissociated in an organic solvent selected from the group consisting of propylene carbonate (PC), ethylene carbonate (EC), diethyl carbonate (DEC), dimethyl carbonate (DMC), dipropyl carbonate (DPC), ethyl methyl carbonate (EMC), dimethyl sulfoxide, acetonitrile, dimethoxyethane, diethoxyethane, tetrahydrofuran, N-methyl-2-pyrrolidone (NMP), gamma-butyrolactone (γ-butyrolactone; GBL) and mixtures thereof.

The separator is a porous substrate having pores. Preferably, the separator allows adhesion to an electrode via hot fusion. Herein, there is no particular limitation in the temperature and pressure for such hot fusion, as long as the separator can be adhered to the electrode. For example, hot fusion may be performed at a temperature of 60~100° C. and a pressure of 1~5 kgf. The separator may be provided in the form of a membrane, a film or fiber.

The separator that may be used in the present invention includes: (a) a porous separator having pores; or (b) a porous separator coated with a gelled polymer coating layer on either or both surfaces thereof. Non-limiting examples of such separators include: polypropylene-based, polyethylene-based or polyolefin-based porous separators; polymer films for solid polymer electrolytes or for gel type polymer electrolytes, such as polyvinylidene fluoride, polyethylene oxide, polyacrylonitrile or polyvinylidene fluoride-hexafluoropropylene copolymer; separators coated with a gelled polymer coating layer. Herein, there is no particular limitation in the gelled polymer, as long as the polymer can be gelled upon swelling with an electrolyte. Additionally, the separator having a gelled polymer coating layer formed thereon may be fabricated by a conventional method known to one skilled in the art. In one embodiment of the method, a gelled polymer, for example PVdF copolymer is dissolved in a solvent, and the resultant solution is coated onto a separator, followed by drying.

The electrolyte may be injected in an adequate step during the manufacture of batteries, according to the processing steps for providing a final product and desired physical properties. In other words, injection of an electrolyte may be performed before the assemblage of a battery or in the final step of the assemblage of a battery.

There is no particular limitation in the outer shape of the electrochemical device according to the present invention. Particularly, the electrochemical device is a prismatic battery. In general, as a casing for packing an electrochemical device is an aluminum prismatic can or aluminum laminate film. Because the structure of the electrochemical device according to the present invention has the same shape as a prismatic casing, there is no vacancy inside of the casing after inserting the electrochemical device into the casing. Therefore, it is possible to realize a highly integrated device, preferably a highly integrated battery, which permits active materials to utilize the space to the highest degree, resulting in a significant increase in the bulk energy density of a battery.

BEST MODE FOR CARRYING OUT THE INVENTION

Reference will now be made in detail to the preferred embodiments of the present invention. It is to be understood that the following examples are illustrative only and the present invention is not limited thereto.

EXAMPLES 1~16

Example 1

1-1. Binder Composition

First, 93.0 g of ion exchange water were introduced into a reactor and the reactor was heated to 75° C. When ion exchange water reached 75° C., 5.8 g of butyl acrylate, 4.3 g of styrene and 0.1 g of sodium lauryl sulfate were introduced into the reactor. Next, 0.08 g of potassium persulfate was dissolved into 5.0 g of ion exchange water and the solution was introduced into the reactor while maintaining the internal temperature of the reactor at 75° C. to provide seed (1).

To seed (1), a reaction mixture obtained by mixing and emulsifying 93.0 g of ion exchange water, 30.0 g of styrene, 60.1 g of butyl acrylate, 0.8 g of aryl methacrylate, 4.4 g of itaconic acid, 6 g of acrylic acid and 0.15 g of sodium lauryl sulfate was introduced in portions over 3 hours, while 0.21 g of potassium persulfate dissolved in 10.0 g of ion exchange water was also introduced in portions over 3 hours to provide a binder polymer. A binder composition for an anode was obtained by adding potassium hydroxide to the binder polymer to adjust the pH to 7. The binder composition was used to manufacture an anode.

The polymerized binder was determined for the physical properties by measuring the final particle diameter, glass transition temperature and gel content. After measuring the particle diameter by using a light scattering device, the binder polymer had a particle diameter of 195 nm. After measuring the glass transition temperature by using a DSC (differential scanning calorimeter) under a heating rate of 10° C./min., the binder polymer had a glass transition temperature of −5° C. Additionally, the binder polymer had a gel content of 85% after the measurement using toluene as a solvent.

1-2. Manufacture of Stacked Cells Using Full Cell as Basic Unit (Manufacture of Cathode)

$LiCoO_2$, carbon black and PVdF were dispersed in NMP in a weight ratio of $LiCoO_2$:carbon black:PVdF of 95:2.5:2.5 to form slurry. Then, the slurry was coated onto aluminum foil, and dried at 130° C. sufficiently, followed by pressing to provide a cathode.

The cathode to be used as a cathode disposed at the outermost layer of the outermost full cell was coated with slurry on one surface of the aluminum foil, thereby providing a cathode comprising an aluminum cathode collector coated with a cathode active material on one surface thereof. The cathode to be used as a cathode disposed at the inner part of the full cell was coated with slurry on both surfaces of the aluminum foil, thereby providing a cathode comprising an aluminum cathode collector coated with a cathode active material on both surfaces thereof. The single-side coated cathode and the double-side coated cathode had a thickness of 105 μm and 140 μm, respectively.

(Manufacture of Anode)

Graphite, conductive carbon (Super-P), the binder composition according to Example 1-1 and water soluble polymer carboxymethyl cellulose were dispersed in water in a weight ratio of graphite:conductive carbon (Super-P): the binder composition according to Example 1-1:water soluble polymer carboxymethyl cellulose of 94:1:2.5:2.5 to form slurry. Then, the slurry was coated onto copper foil and dried at 130° C. sufficiently, followed by pressing, to provide an anode.

The anode to be used as an anode disposed at the outermost layer of the outermost full cell was coated with slurry on one surface of the copper foil, thereby providing an anode comprising a copper anode collector coated with an anode active material on one surface thereof. The anode to be used as an anode disposed at the inner part of the full cell was coated with slurry on both surfaces of the copper foil, thereby providing an anode comprising a copper anode collector coated with an anode active material on both surfaces thereof. The single-side coated anode and the double-side coated anode had a thickness of 100 μm and 135 μm, respectively.

(Manufacture of Separator, Separator Film and Polymer Film for Polymer Electrolyte)

A polypropylene film having a microporous structure and a thickness of 16 μm was used as a first polymer separator. Then, a multilayer polymer film was manufactured by using polyvinylidnene fluoride-chlorotrifluoroethylene copolymer 32008 available from Solvey Polymer Company as a second gelled polymer. In other words, 6 g of the copolymer 32008 was introduced into 194 g of acetone and stirred thoroughly while maintaining the temperature at 50° C. After 1 hour, transparent solution, in which the copolymer 32008 was dissolved completely, was coated onto the first polymer separator via a coating process. The copolymer 32008 was coated to a thickness of 1 μm, and the finally formed multilayer polymer film had a thickness of 18 μm.

(Manufacture of Full Cell Disposed at Inner Part)

The cathode comprising a cathode collector coated with a cathode active material on both surfaces thereof was cut into a rectangular shape having a size of 2.9 cm×4.3 cm with the exception of a portion corresponding to a tab. The anode comprising an anode collector coated with an anode active material on both surfaces thereof was cut into a rectangular shape having a size of 3.0 cm×4.4 cm with the exception of a portion corresponding to a tab. Next, the multilayer polymer film obtained as described above was cut into a size of 3.1 cm×4.5 cm and was inserted between the cathode and the anode to provide an electrode assembly. Then, the electrode assembly was passed through a roll laminator at 100° C. to perform thermal bonding between each electrode and the separator, thereby providing an inner full cell.

(Manufacture of Full Cell Disposed at Outermost Part)

The cathode comprising a cathode collector coated with a cathode active material on one surface thereof was cut into a rectangular shape having a size of 2.9 cm×4.3 cm with the exception of a portion corresponding to a tab. The anode comprising an anode collector coated with an anode active material on both surfaces thereof was cut into a rectangular shape having a size of 3.0 cm×4.4 cm with the exception of a portion corresponding to a tab. Next, the multilayer polymer film obtained as described above was cut into a size of 3.1 cm×4.5 cm and was inserted between the cathode and the anode to provide an electrode assembly. Then, the electrode assembly was passed through a roll laminator at 100° C. to perform thermal bonding between each electrode and the separator, thereby providing a first outermost full cell.

In addition, the cathode comprising a cathode collector coated with a cathode active material on both surfaces thereof was cut into a rectangular shape having a size of 2.9 cm×4.3 cm with the exception of a portion corresponding to a tab. The anode comprising an anode collector coated with an anode active material on both surfaces thereof (see Korean Laid-Open Patent No. 2001-0082058, p. 8) was cut into a rectangular shape having a size of 3.0 cm×4.4 cm with the exception of a portion corresponding to a tab. Next, the multilayer polymer film obtained as described above was cut into a size of 3.1 cm×4.5 cm and was inserted between the cathode and the anode to provide an electrode assembly. Then, the electrode assembly was passed through a roll laminator at 100° C. to perform thermal bonding between each electrode and the separator, thereby providing a second outermost full cell.

(Stacking of Full Cells)

The full cells obtained as described above were disposed in the order of the first outermost full cell, the inner full cell and the second outermost full cell. At this time, each single-side coated electrode was disposed in such a manner that the collector was disposed at the outermost layer. Then, the multilayer polymer film obtained as described above was cut into a size of 3.1 cm×4.5 cm and was inserted into each overlapped portion of the full cells. Then, the stacked structure was passed through a roll laminator at 100° C. to perform thermal bonding and adhesion between each full cell and the polymer film.

(Manufacture of Battery)

The stacked full cells obtained as described above was introduced into an aluminum laminate casing, and a liquid electrolyte, comprising 1M $LiPF_6$ in EC (ethylene carbonate) and EMC (ethyl methyl carbonate) mixed in a weight ratio of 1:2, was injected thereto, followed by packaging. By doing so, a lithium ion polymer battery was manufactured.

Examples 2~7

Seed (1) obtained from Example 1 was used and the monomers for emulsion polymerization, which had various compositions as described in the following Table 1, were introduced thereto to provide binder polymers, in the same manner as described in Example 1. The physical properties of the binder polymers were also shown in Table 1.

Additionally, stacked cells using a full cell as a basic unit and batteries were manufactured in the same manner as described in Example 1.

TABLE 1

| (unit: g) | Ex. 2 | Ex. 3 | Ex. 4 | Ex. 5 | Ex. 6 | Ex. 7 |
|---|---|---|---|---|---|---|
| Ethyl acrylate | — | — | 9.2 | — | 5.6 | — |
| n-butyl acrylate | 108.2 | — | 126.0 | 108.2 | 79.9 | 104.4 |
| 2-ethylhexyl acrylate | — | 103.5 | — | — | 26.1 | — |
| Methyl methacrylate | — | — | — | — | 7.7 | — |
| Aryl methacrylate | 1.4 | 1.4 | 1.4 | 1.4 | 1.4 | 1.4 |
| Styrene | — | 58.7 | 27.0 | 54.0 | 35.2 | 46.8 |
| Acrylonitrile | 54.0 | — | — | — | 7.7 | — |
| Itaconic acid | 9.7 | 9.7 | 9.7 | — | 4.8 | 20.7 |
| Acrylic acid | — | — | — | 9.7 | 4.9 | — |
| Particle diameter (nm) | 197 | 194 | 190 | 194 | 196 | 198 |
| Glass transition temperature (° C.) | −1 | −5 | −2 | −7 | −3 | −2 |
| Gel content (%) | 85 | 85 | 86 | 85 | 85 | 84 |

Examples 8~15

Seed (1) obtained from Example 1 was used and the monomers for emulsion polymerization, which had various compositions as described in the following Table 2, were introduced thereto to provide binder polymers, in the same manner as described in Example 1. The physical properties of the binder polymers were also shown in Table 2. As compared to the binder polymer according to Example 1, the binder polymers according to Examples 8~10 had a different glass transition temperature, the binder polymers according to Examples 11~13 has a different gel content, and the binder polymers according to Examples 14 and 15 had a different particle size. The seed used to provide the binder polymers according to Examples 14 and 15 was obtained by using sodium lauryl sulfate in an amount of 0.3 g and 0.06 g, respectively.

Additionally, stacked cells using a full cell as a basic unit and batteries were manufactured in the same manner as described in Example 1.

TABLE 2

| (unit: g) | Ex. 8 | Ex. 9 | Ex. 10 | Ex. 11 | Ex. 12 | Ex. 13 | Ex. 14 | Ex. 15 |
|---|---|---|---|---|---|---|---|---|
| n-butyl acrylate | 135.0 | 81.2 | 59.2 | 110.2 | 107.2 | 105.2 | 108.2 | 108.2 |
| Aryl methacrylate | 1.4 | 1.4 | 1.4 | 4.2 | 0.2 | 0.0 | 1.4 | 1.4 |
| Styrene | 27.2 | 81.0 | 103.0 | 52.0 | 55.0 | 57.0 | 54.0 | 54.0 |
| Itaconic acid | 9.7 | 9.7 | 9.7 | 9.7 | 9.7 | 9.7 | 9.7 | 9.7 |
| Particle diameter (nm) | 195 | 193 | 191 | 190 | 195 | 198 | 110 | 285 |
| Glass transition temperature (° C.) | −25 | 18 | 40 | −3 | −5 | −3 | −4 | −5 |
| Gel content (%) | 88 | 83 | 79 | 97 | 54 | 35 | 86 | 85 |

Example 16

First, 167.4 g of ion exchange water were introduced into a reactor and the reactor was heated to 75° C. When ion exchange water reached 75° C., 8.1 g of 1,3-butadiene, 10.1 g of styrene and 0.23 g of sodium lauryl sulfate were introduced into the reactor. Next, 0.14 g of potassium persulfate was dissolved into 9.0 g of ion exchange water and the solution was introduced into the reactor while maintaining the internal temperature of the reactor at 75° C. to provide seed (2). The seed (2) was used to provide a binder polymer and to determine the effect of a composition of seed upon the physical properties of a binder.

Other conditions in the preparation of the binder polymer were the same as Example 1 so as to evaluate the physical properties of a binder depending on the kind of seed. The finally formed binder had a particle diameter of 201 nm, a glass transition temperature of −3° C. and a gel content of 87%.

Additionally, a stacked cell using a full cell as a basic unit and a battery were manufactured in the same manner as described in Example 1.

COMPARATIVE EXAMPLES 1~4

Seed (1) obtained from Example 1 was used and the monomers for emulsion polymerization, which had various compositions as described in the following Table 3, were introduced thereto to provide binder polymers, in the same manner as described in Example 1. The physical properties of the binder polymers were also shown in Table 3. Additionally, stacked cells using a full cell as a basic unit and batteries were manufactured in the same manner as described in Example 1.

TABLE 3

| (unit: g) | Comp. Ex. 1 | Comp. Ex. 2 | Comp. Ex. 3 | Comp. Ex. 4 |
|---|---|---|---|---|
| 1,3-butadiene | 85.3 | 85.3 | 85.3 | 85.3 |
| n-butyl acrylate | — | — | — | — |
| Methyl methacrylate | — | 76.9 | — | 25.6 |
| Aryl methacrylate | 1.4 | 1.4 | 1.4 | 1.4 |
| Styrene | 76.9 | — | — | 25.7 |
| Acrylonitrile | — | — | 76.9 | 25.6 |
| Itaconic acid | 9.7 | 9.7 | 9.7 | 4.9 |
| Acrylic acid | — | — | — | 4.8 |
| Particle diameter (nm) | 199 | 195 | 197 | 197 |
| Glass transition temperature (° C.) | −3 | −5 | −1 | −4 |
| Gel content (%) | 88 | 86 | 85 | 86 |

EXPERIMENTAL EXAMPLE 1

Evaluation of Adhesion

The following experiment was performed to evaluate the adhesion of an electrode active material to a collector in the electrode obtained by using the binder composition according to the present invention.

Each of the electrodes according to Examples 1~16 was used as a sample, and each of the electrodes according to Comparative Examples 1~4 was used as a control.

After each electrode, cut into a size of 1 cm, was attached onto a glass substrate, 180° peel strength was measured while the collector was removed. Such measurement was repeated at least five times and the measured values were averaged for the final evaluation. The experimental results are shown in the following Table 4.

EXPERIMENTAL EXAMPLE 2

Evaluation of Thermal Bonding Characteristics

The following experiment was performed to evaluate thermal bonding characteristics in the multiply stacked cells obtained by using the binder composition according to the present invention.

Each of the multiply stacked cells according to Examples 1~16 was used as a sample, and each of the multiply stacked cells according to Comparative Examples 14 was used as a control.

To evaluate thermal bonding characteristics between a polymer electrolyte film and an anode, a separator was removed from the anode after the thermal bonding, and then the degree of thermal bonding was observed. At this time, it was determined that thermal bonding was accomplished when the anode active material remained on the separator after the removal of the separator. On the other hand, it was determined that thermal bonding was not accomplished when no anode active material remained on the separator. Such thermal bonding characteristics are also shown in Table 4.

EXPERIMENTAL EXAMPLE 3

Evaluation of Quality of Battery

The following experiment was performed to evaluate the quality of a lithium secondary battery using the binder composition according to the present invention.

Each of the lithium ion polymer batteries according to Examples 1~16 and Comparative Examples 1~4 was used.

Quality of a battery, determined in this Example, included rate characteristics and lifespan characteristics. Rate characteristics were evaluated by calculating a percent ratio of the capacity, measured by a 0.5C constant-current method and by a 1.0C constant-current method, to the capacity measured by a 0.2C constant-current method. Lifespan characteristics were evaluated by calculating a percent ratio of the capacity, measured by a 0.2C constant-current method after repeating 30 charge/discharge cycles, to the initial capacity. Five coin type batteries were manufactured by using the same binder composition, the same experiment was performed for the five batteries, and then the measured values were averaged for the final evaluation. The experimental results are also shown in the following Table 4.

TABLE 4

| | | | Battery quality | | |
|---|---|---|---|---|---|
| | Adhesion (g/cm) | Thermal bonding characteristics | Rate characteristics (%) (0.5 C/0.2 C) | Rate characteristics (%) (1.0 C/0.2 C) | Lifespan characteristics (%) |
| Ex. 1 | 55.3 | o | 98.9 | 97.5 | 89.2 |
| Ex. 2 | 50.1 | o | 99.2 | 98.0 | 90.1 |
| Ex. 3 | 51.3 | o | 98.8 | 97.4 | 89.0 |
| Ex. 4 | 53.2 | o | 98.9 | 97.5 | 89.1 |
| Ex. 5 | 52.8 | o | 98.8 | 97.4 | 89.0 |
| Ex. 6 | 52.6 | o | 98.8 | 97.4 | 89.0 |
| Ex. 7 | 60.6 | o | 99.2 | 97.9 | 90.0 |
| Comp. Ex. 1 | 35.1 | x | 97.2 | 95.9 | 75.3 |
| Comp. Ex. 2 | 39.5 | x | 97.9 | 96.0 | 79.8 |
| Comp. Ex. 3 | 30.8 | x | 97.0 | 95.3 | 73.1 |
| Comp. Ex. 4 | 55.3 | x | 96.6 | 94.2 | 70.8 |
| Ex. 8 | 40.9 | o | 99.1 | 97.8 | 89.7 |
| Ex. 9 | 38.0 | o | 98.1 | 96.5 | 81.7 |
| Ex. 10 | 52.0 | o | 98.8 | 97.4 | 89.0 |
| Ex. 11 | 53.2 | o | 98.8 | 97.4 | 89.1 |
| Ex. 12 | 50.3 | o | 98.7 | 97.3 | 89.0 |
| Ex. 13 | 57.2 | o | 99.0 | 97.6 | 89.4 |
| Ex. 14 | 54.1 | o | 98.9 | 97.5 | 89.1 |
| Ex. 15 | 51.5 | o | 98.8 | 97.4 | 89.0 |
| Ex. 16 | 53.5 | o | 98.8 | 97.4 | 89.1 |

As can be seen from the above results described in Table 4, the present invention has the following characteristics:

(1) The binder composition according to the present invention provides excellent adhesion between an electrode active material and a collector in an electrode. Therefore it can be seen that the binder composition can improve the structural stability and the quality of a battery.

Figure 4:
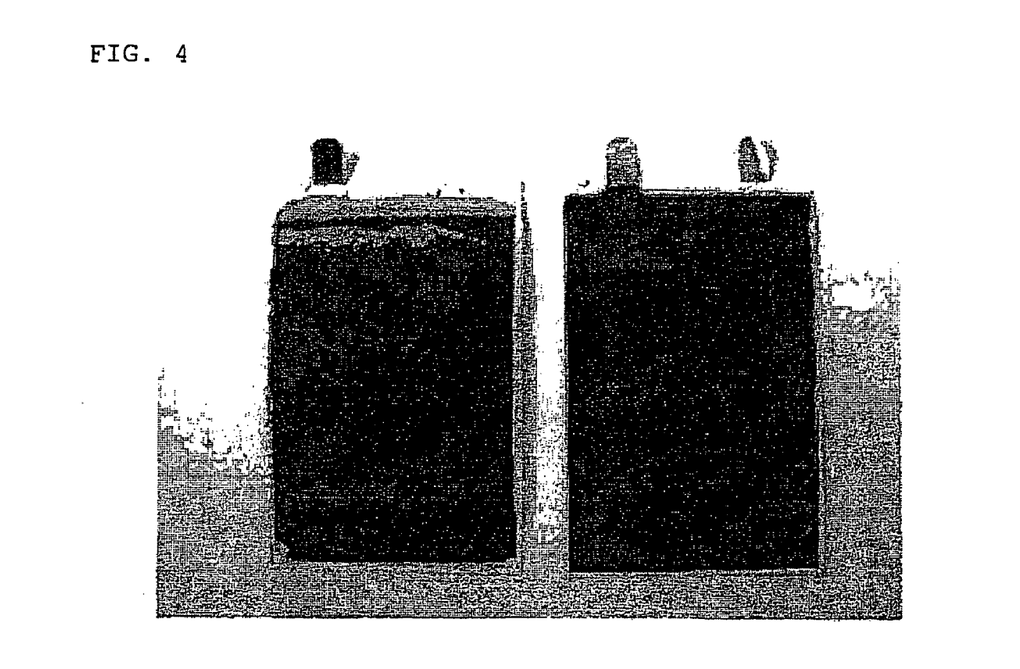
FIGS. 4~6 are photographic views showing the thermal bonding characteristics of multiply stacked cells using the binders according to Example 1 (FIG. 4), Example 2 (FIG. 5) and Comparative Example 1 (FIG. 3).
Figure 5:
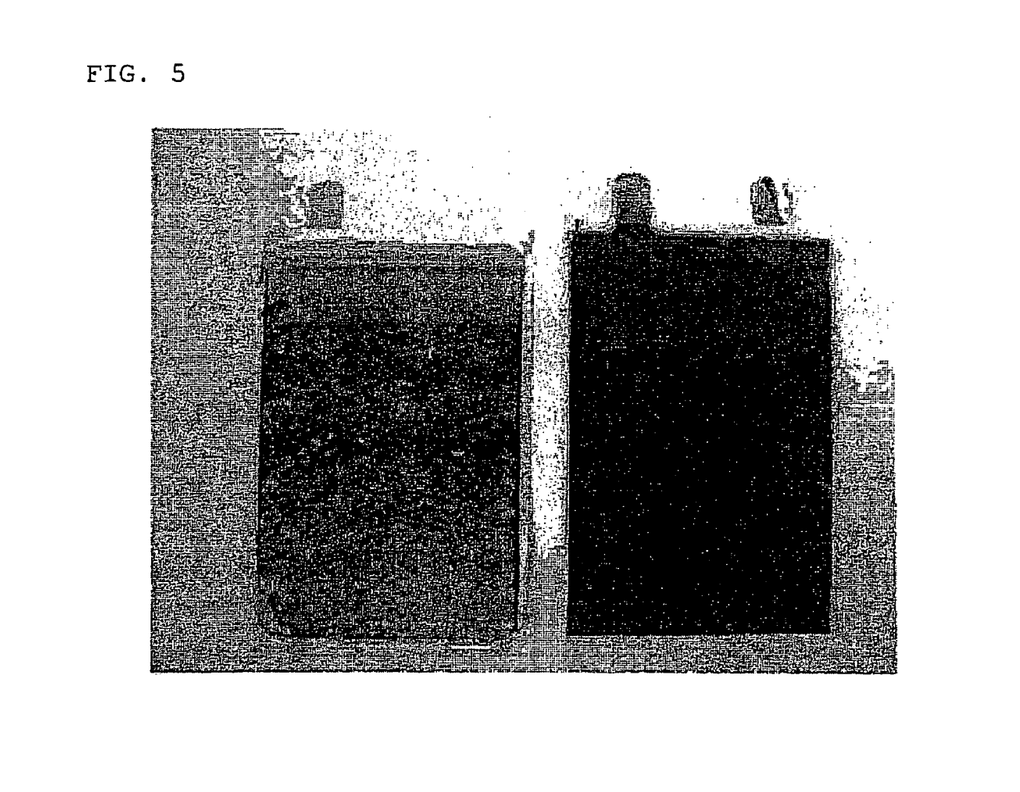
Figure 6:
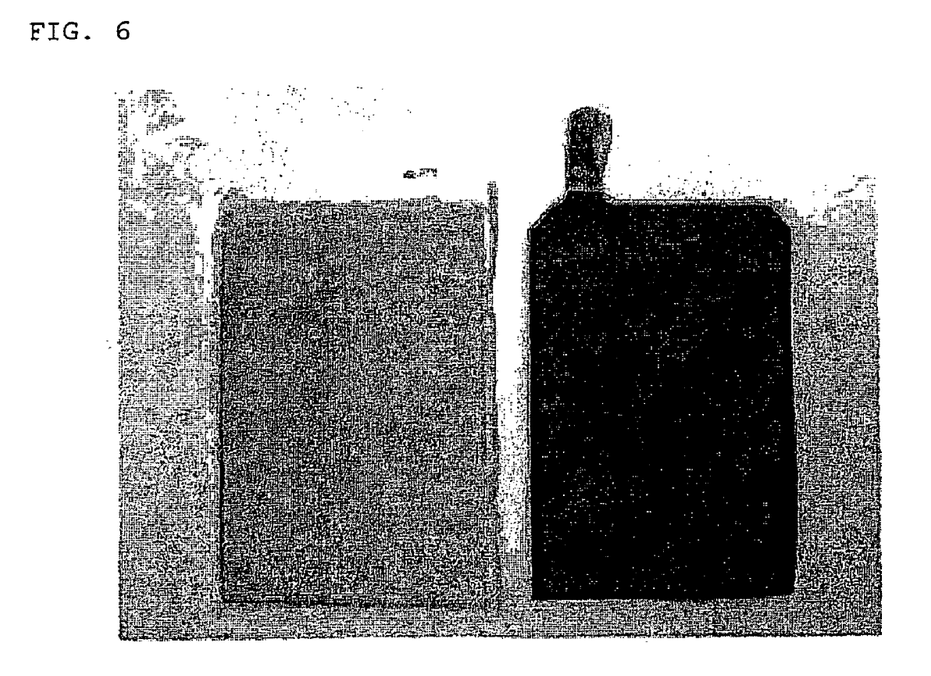

(2) Additionally, after evaluating the thermal bonding characteristics in multiply stacked cells, it was shown that the multiply stacked cells obtained by using the binder composition according to the present invention had excellent thermal bonding characteristics compared to multiply stacked cells obtained by using the binders according to Comparative Examples (see Table 4 and FIGS. 4~6). That is, in the case of the stacked cells according to Comparative Example 1, no anode active material remained in the separator. This indicates that the adhesion of the binder according to Comparative Example 1 is degraded significantly after the thermal bonding. On the contrary, in the case of the multiply stacked cells according to Examples 1 and 2 using the binder according to the present invention, the anode active material remained on the separator. Therefore, it can be seen that the binder according to the present invention maintains excellent adhesion continuously even after the thermal bonding.

(3) Further, after evaluating the quality of a lithium secondary battery, the lithium secondary battery obtained by using the binder composition according to the present invention shows significantly improved rate characteristics and lifespan characteristics, as compared to the batteries according to Comparative Examples 1~4 (see Table 4). This indicates that the binder according to the present invention improves the adhesion among electrode active material particles and between an electrode active material and a collector, in an electrode, by virtue of the physical properties, including excellent adhesion and thermal bonding characteristics, and thus realizes structural stability of the electrode. Additionally, the binder according to the present invention allows the overlapped portion between an electrode and a separator to be bonded via hot fusion, in an electrode chemical device comprising multiply stacked cells. Therefore, it can be seen that the binder can improve the rate characteristics and lifespan characteristics of an electrochemical device, preferably a lithium ion polymer battery.

As can be seen from the above experimental results, the binder according to the present invention has excellent adhesion and thermal bonding characteristics, and thus is particularly useful for an electrochemical cell comprising multiply stacked electrochemical cells (e.g., full cells or bicells), for example for a lithium ion polymer battery. Additionally, use of the binder, having excellent adhesion and thermal bonding characteristics, permits easy manufacture of an electrochemical device comprising multiply stacked electrochemical cells, for example, a lithium ion polymer battery including multiply stacked electrochemical cells using a full cell or bicell as a basic unit and having a separator inserted into each overlapped portion. Also, it is possible to efficiently utilize the inner space of the above electrochemical device, and thus to realize a highly integrated electrochemical device comprising an electrode active material to the maximum content.

INDUSTRIAL APPLICABILITY

As can be seen from the foregoing, the present invention provides a binder having excellent adhesion and thermal bonding characteristics. The binder according to the present invention can significantly improve the overall quality of a battery, including rate characteristics and lifespan characteristics.

The invention claimed is:

1. An electrochemical device, which comprises:
   (A) a binder of polymer particles obtained by polymerizing a composition consisting of:
       (a) 20~79 parts by weight of a (meth)acrylic acid ester monomer;
       (b) 20~60 parts by weight of at least one vinyl monomer selected from the group consisting of styrene, α-methylstyrene, β-methylstyrene and p-t-butystyrene;
       (c) 0.01~30 parts by weight of an unsaturated carboxylic acid monomer; and
       (d) at least one additive selected from the group consisting of a molecular weight modifier, a crosslinking agent and a polymerization initiator, based on 100 parts by weight of a binder polymer; and
   (B) electrochemical cells stacked multiply by using the binder, wherein the binder allows electrode active materiel particles in an electrode to be fixed and interconnected among themselves and between the electrode active material and a collector, and the electrode and a separator that is in contact with the electrode are bonded to each other by way of hot fusion.

2. The electrochemical device according to claim 1, which uses a full cell or a bicell as a basic unit to provide the multiply stacked cells, wherein a separator is inserted into each overlapped portion of the full cell and the bicell, and the separator and the full cell or bicell are bonded to each other via hot fusion.

3. The electrochemical device according to claim 2, wherein the full cell is an electrochemical cell comprising a cathode, a separator or an anode, in order or inverse order, and the bicell is an electrochemical cell comprising a cathode, a separator, an anode, a separator, and a cathode; or an anode, a separator, a cathode, a separator, and an anode.

4. The electrochemical device according to claim 2, wherein each full cell or bicell present at the outermost part of the electrochemical device includes a cathode comprising a cathode collector coated with a cathode active material on one surface thereof, or an anode comprising an anode collector coated with an anode active material on one surface thereof, and collector foil is disposed at the outermost layer.

5. The electrochemical device according to claim 2, wherein both surfaces of a current collector are coated with the same electrode active material, and the electrode active material present on the outer surface, which is not utilized in a unit cell, forms another full cell along with an electrode active material coated on the counter electrode of another unit cell, adjacent to the unit cell.

6. The electrochemical device according to claim 2, wherein the separator interposed between both electrodes and/or disposed at the overlapped portion is capable of adhesion via hot fusion.

7. The electrochemical device according to claim 6, wherein the adhesion via hot fusion is performed at a temperature of 60~100° C.

8. The electrochemical device according to claim 2, wherein the separator is either of: (a) a porous separator having pores; and (b) a porous separator having a gelled polymer coating layer on either surface or both surfaces thereof.

9. The electrochemical device according to claim 1, wherein the (meth)acrylic acid ester monomer is at least one monomer selected from the group consisting of methyl acrylate, ethyl acrylate, propyl acrylate, isopropyl acrylate, n-butyl acrylate, isobutyl acrylate, n-amyl acrylate, isoamyl acrylate, n-hexyl acrylate, 2-ethylhexyl acrylate, hydroxyethyl acrylate, hydroxypropyl acrylate, lauryl acrylate, methyl methacrylate, ethyl methacrylate, propyl methacrylate, isopropyl methacrylate, n-butyl methacrylate, isobutyl methacrylate, n-amyl methacrylate, isoamyl methacrylate, n-hexyl methacrylate, 2-ethylhexyl methacrylate, hydroxyethyl methacrylate, hydroxypropyl methacrylate, and lauryl methacrylate.

10. The electrochemical device according to claim 1, wherein the unsaturated carboxylic acid monomer is at least one monomer selected from the group consisting of acrylic acid, methacrylic acid, itaconic acid, fumaric acid, citraconic acid, methaconic acid, glutaconic acid, crotonic acid and isocrotonic acid.

11. The electrochemical device according to claim 1, wherein the binder has a final particle diameter of 100~400 nm.

12. The electrochemical device according to claim 1, wherein the binder has a glass transition temperature (Tg) of −30~50° C.

13. The electrochemical device according to claim 1, wherein the binder has a gel content of 30~99%.

14. The electrochemical device according to claim 1, wherein the electrode active material and the collector, interconnected to each other by the binder, show an interfacial adhesion of 38.0 g/cm or higher.

15. The electrochemical device according to claim 1, wherein the binder is capable of being dispersed in a non-aqueous or aqueous solvent.

16. The electrochemical device according to claim 1, which is a lithium secondary battery.

17. A binder, of polymer particles obtained by polymerizing a composition consisting of:
   (a) 20~79 parts by weight of a (meth)acrylic acid ester monomer;
   Co) 20~60 parts by weight of at least one vinyl monomer selected from the group consisting of styrene, a-methylstyrene, b-methylstyrene and p-t-butystyrene;
   (c) 0.01-30 parts by weight of an unsaturated carboxylic acid monomer; and
   (d) at least one additive selected from the group consisting of a molecular weight modifier, a crosslinking agent and a polymerization initiator, based on 100 parts by weight of a binder polymer, and
   which maintains adhesion after carrying out hot fusion at a temperature of 60~100'C.

18. The binder according to claim 17, which has a final particle diameter of 100~400 nm, a glass transition temperature (Tg) of −30~50° C., and a gel content of 30~99%.

* * * * *